United States Patent [19]

Lawson

[11] Patent Number: 5,500,506
[45] Date of Patent: Mar. 19, 1996

[54] OPTICAL SYSTEM FOR POSITIONING LASER BEAMS IN A STRAIGHT OR ANGULAR POSITION

[75] Inventor: William E. Lawson, Somerset, Wis.

[73] Assignee: Laser Machining, Inc., Somerset, Wis.

[21] Appl. No.: 274,239

[22] Filed: Jul. 13, 1994

[51] Int. Cl.⁶ .................................................. B23K 26/02
[52] U.S. Cl. ........................ 219/121.67; 219/121.77; 219/121.79; 219/121.74; 219/121.75
[58] Field of Search .......................... 219/121.6, 121.67, 219/121.68, 121.69, 121.7, 121.71, 121.72, 121.73, 121.74, 121.75, 121.76, 121.77, 121.78, 121.79, 121.8, 121.81; 359/223; 372/701

[56] References Cited

U.S. PATENT DOCUMENTS

| | | | |
|---|---|---|---|
| 3,953,706 | 4/1976 | Harris et al. | 219/121.68 |
| 4,563,565 | 1/1986 | Kampfer et al. | 219/121.69 |
| 4,818,322 | 4/1989 | Morino et al. | 219/121.76 |
| 4,855,565 | 8/1989 | Thomas et al. | 219/121.79 |
| 5,043,553 | 8/1991 | Corfe et al. | 219/121.7 |

FOREIGN PATENT DOCUMENTS

| | | | |
|---|---|---|---|
| 57-100889 | 6/1982 | Japan | 219/121.76 |
| 2-059191 | 2/1990 | Japan | 219/121.72 |
| 4-017989 | 1/1992 | Japan | 219/121.6 |
| 4-344882 | 12/1992 | Japan | 219/121.67 |

*Primary Examiner*—Marvin M. Lateef
*Assistant Examiner*—Gregory L. Mills
*Attorney, Agent, or Firm*—Kinney & Lange

[57] ABSTRACT

The present invention relates to an apparatus for cutting a workpiece comprising an energy source for providing a beam of energy and a directing mechanism for directing the beam energy from the energy source to a focal point. The beam of energy is provided along an axis. The directing mechanism includes a frame that is mounted to the energy source. A first focusing mechanism is provided to focus the beam of energy to a focal point that is along the axis. The first focusing mechanism is mounted to the frame between the energy source and the focal point. A first reflective mirror is slidably mounted to the frame between the energy source means and the first focusing means. The slidable mounting of the first reflective mirror allows the first reflective mirror to be moved into the path of the beam of energy and thereby cause a first reflected beam portion to be formed. A second reflective mirror is also mounted to the frame. The second reflective mirror is positioned to reflect the first reflected beam portion and thereby form a second reflected beam portion. A second focusing mechanism for focusing the second reflected beam portion to the focal point is mounted to the frame between the second reflective mirror and the focal point.

14 Claims, 6 Drawing Sheets

1

OPTICAL SYSTEM FOR POSITIONING LASER BEAMS IN A STRAIGHT OR ANGULAR POSITION

BACKGROUND OF THE INVENTION

The present invention relates generally to optical systems for guiding a laser beam. More particularly, the present invention relates to a constant tool center point optical system for guiding a laser beam in a cutting device.

Laser cutting devices are well known. These devices typically include a relatively large energy source for producing an energy beam. The size of the energy source makes it preferable to fixedly mount the energy source. Accordingly, in the early designs for laser cutting devices, the energy source was mounted at an angle that was desired to be cut into a workpiece. When a different angle was desired, the energy source was turned off and then repositioned. Thus, it was difficult and time consuming to cut numerous angles in a single workpiece.

To avoid these difficulties, mirrors were positioned between the energy source and the workpiece. Adjustment of the mirrors allowed a variety of angles to be cut into the workpiece. However, complicated control circuitry was required to direct the position of the mirrors to enable the laser beam to cut at different angles.

Constant tool center point cutting devices were then developed to assist in forming angled cuts in a workpiece. In a constant tool center point cutting device, the cutting point of the devices remains constant and the workpiece is cut by moving the workpiece to the cutting point of the device. A prior art constant tool center point cutting device, such as is illustrated at 10 in FIG. 1, allows a directing mechanism 12 of the cutting device 10 to be rotated about an axis 14. As the directing mechanism 12 is rotated, an energy beam 16 is continually focused to a constant point 18. Because the focal point of the energy beam 16 is always at the constant point 18, the cutting device 10 does not require a use of an offset handling controller to direct the energy beam 16 as the directing mechanism 12 is rotated.

Another prior art constant tool center point cutting device is illustrated at 40 in FIG. 2. A directing mechanism 41 of the cutting device 40 uses four mirrors 42, 44, 46, and 48 to direct an energy beam 50 toward a focal point 52. In addition to having a constant tool center point, the cutting device 40 allows the cutting angle 54 to be adjusted by rotating a first section 56 of the directing mechanism 41 about an axis 58. Beam alignment in the four mirror design is complicated because there is five axes of rotation that must be aligned.

SUMMARY OF THE INVENTION

The present invention includes an apparatus for cutting a workpiece that includes an energy source and an energy beam guide. The energy source produces a beam of energy that is projected along an axis. The energy beam guide is mounted to the energy source such that the energy beam can rotate about the axis. The energy beam guide, which includes a frame, directs the energy beam from the energy source to a focal point.

A first focusing lens is mounted to the frame and is positioned between the energy source and the focal point. The first focusing lens focuses the energy beam to the focal point that is along the axis.

A first reflective mirror is slidably mounted to the frame between the energy source and the first focusing lens. The slidable mounting of the first reflective mirror allows the first reflective mirror to be moved into the path of the energy beam and thereby cause a first reflected beam portion to be formed.

A second reflective mirror is mounted to the frame and positioned to reflect the first reflected beam portion and thereby cause a second reflected beam portion to be formed. The second reflected beam of energy is then focused towards the focal point using a second focusing lens. The second focusing lens is mounted to the frame between the second reflective mirror and the focal point.

DETAILED DESCRIPTION OF THE PREFERRED EMBODIMENTS

Figure 3:
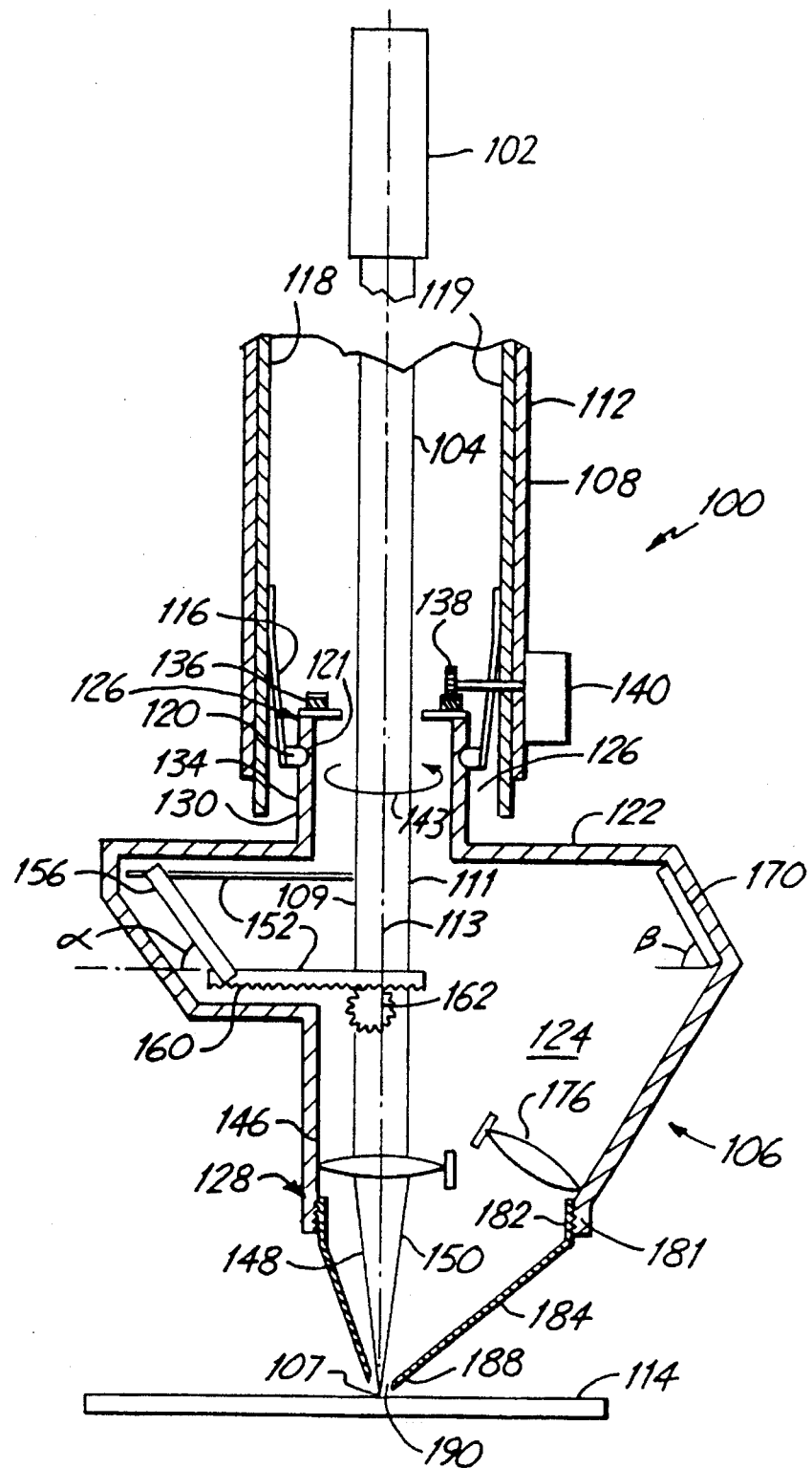
FIG. 3 is a sectional view of the optical system of the present invention in a first position.

A two mirror constant tool center point cutting device of the present invention is illustrated at 100 in FIG. 3. The two mirror cutting device 100 includes an energy beam guide 106 that guides a single energy beam 104, which is generated by an energy source 102 towards a focal point 107.

The two mirror cutting device 100 of the present invention enables the energy beam 104 to be directed at a workpiece 114 in a vertical or angled manner. The energy source 102 is provided proximate to the workpiece 114. The energy source 102 is preferably a $CO_2$ laser. However, one of ordinary skill in the art would readily appreciate that other laser energy sources may be selected depending on the characteristics of the workpiece 114. The energy beam 104 is projected from the energy source 102 along an axis 113 as shown by lines 109 and 111.

Between the energy source 102 and the energy beam guide 106, the energy beam 104 is enclosed by a protective sleeve 108, which prevents foreign objects from interfering with the energy beam 104. The protective sleeve 108 is of a generally cylindrical shape.

A length of the protective sleeve 108 is adjustable so that a distance between the energy source 102 and the energy beam guide 106 can be changed when it is desired to cut workpiece 114 of different thicknesses. A variety of methods are known in the art to adjust the length of the protective sleeve 108. In a preferred embodiment, the protective sleeve 108 is a telescoping configuration, which includes a first cylindrical portion 112 and a second cylindrical portion 119. An inner diameter of the first portion 112 is slightly larger than an outer diameter of the second portion 119 so that the second portion 119 can slide into the first portion 112. The length of the protective sleeve 108 is adjusted by sliding the first portion 112 with respect to the second portion 119.

A plurality of longitudinally extending angularly spaced apart fingers 116 project from an inner surface 118 of the protective sleeve 108. Each of the fingers 116 is resilient and has a radial projection 120. The radial projection 120 is preferably of a spherical shape.

The energy beam guide 106 includes a frame 122 that defines an inner cavity 124. In addition to providing a structure to mount the components that direct the energy beam 104, the frame 122 prevents foreign objects from interfering with the energy beam 104.

The frame 122 includes an input end 126 and an output end 128. The input end 126 has a cylindrical portion 130. An arcuate annular recess 121 is formed in an outer surface 134 of the cylindrical portion 130.

The resilient fingers 116 are positioned so that the radial projections 120 engage the recess 121 and thereby retain the energy beam guide 106 in relation to the protective sleeve 108. The radial projections 120 freely slide in the recess 121. As a result of this configuration the energy beam guide 106 rotates with respect to the protective sleeve 108. The rotational mounting of the frame 122 allows the frame 122 to be rotated about the axis 113 as depicted by arrow 143.

The resilient fingers 116 not only retain the energy beam guide 106 in relation to the protective sleeve 108 but also permit the energy beam guide 106 to be removed from the protective sleeve for maintenance or inspection. In the event of an impact against the energy beam guide 106, the resilient fingers 116 permit the energy beam guide 106 to twist or move inwardly a short distance into the protective sleeve 108. The resilient fingers 6 thereby minimize the risk of damaging the energy beam guide 106.

A first lens 146 is mounted to the frame 122. The first lens 146 focuses the energy beam 104 along a path as indicated by lines 148 and 150 to a focal point 107 that is on the workpiece 114. When the energy beam 104 is focused as indicated by lines 148 and 150 to the focal point, a vertical aperture is formed in the workpiece 114.

Figure 4:
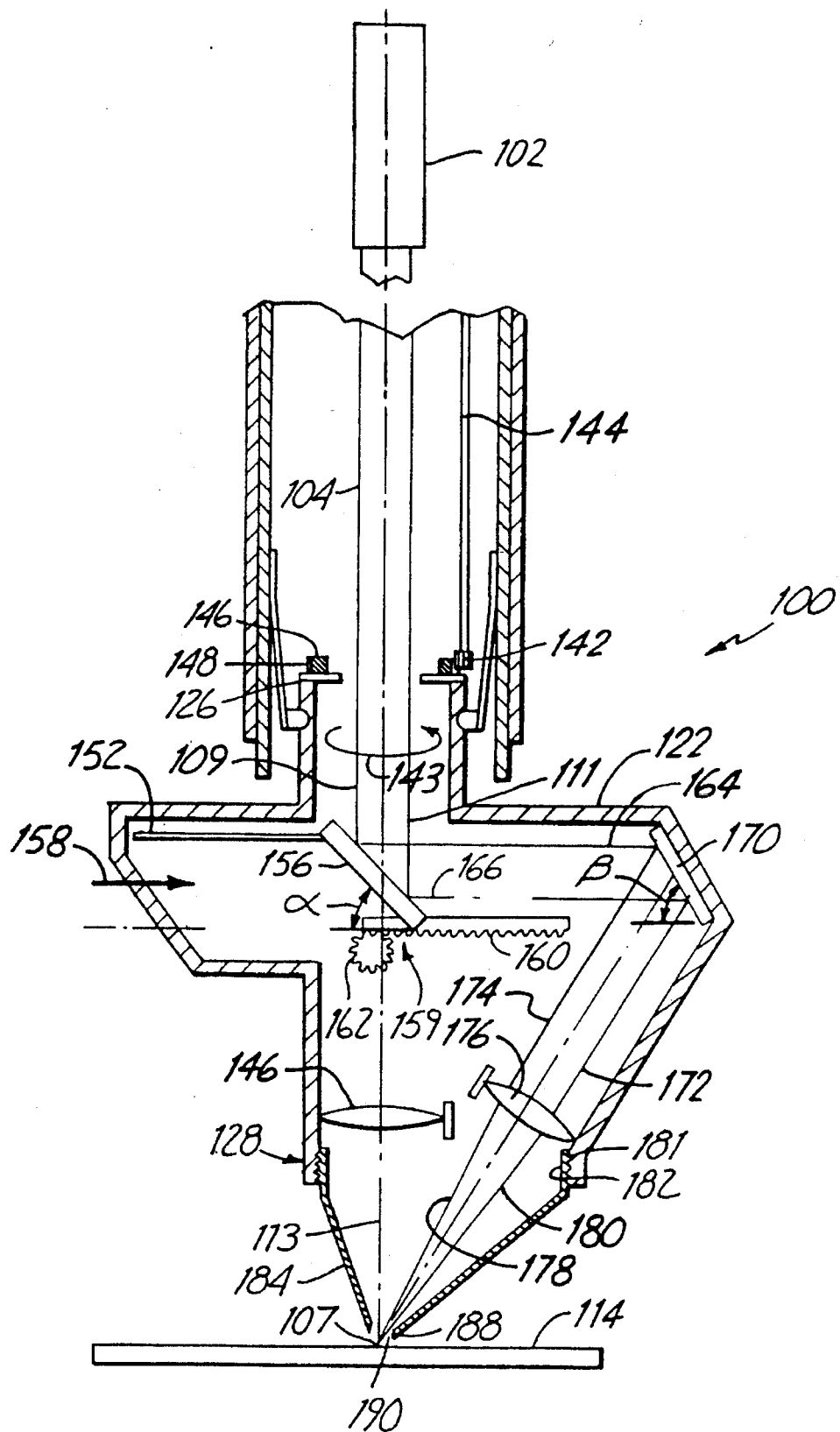
FIG. 4 is a sectional view of the optical system of the present invention in a second position.

A guide track 152 is mounted to the frame 122 between the energy source 102 and the first lens 146 as illustrated in FIG. 4. The guide track 152 permits a first 100% reflective mirror 156 to be slidably mounted to the frame 122. The first mirror 156 is slidable as indicated by arrow 158 to allow the first mirror 156 to move into the path of the energy beam 104.

The slidable movement of the first mirror 156 is preferably accomplished using a rack and pinion assembly 159. A toothed rack 160 is mounted to the first mirror 156. A toothed pinion 162 is mounted to the frame 122 proximate to the toothed rack 160 such that teeth on the pinion 162 engage teeth on the rack 160. Rotation of the toothed pinion 162 is accomplished by a motor (not shown).

Alternatively, the first mirror 156 can be moved along a path that is normal the plane illustrated in FIG. 3. By moving the first mirror 156 in the normal direction, the distance between the first mirror 156 and the second mirror 170 is maintained constant. For some applications, the constant distance between the first mirror 156 and the second mirror 170 provides advantages in aligning the laser beam 104 and maintaining the laser beam alignment while the cutting device 100 is subjected to actual use conditions.

When the first mirror 156 is positioned in the path of the energy beam 104, the first mirror 156 causes the energy beam 104 to be reflected along a path shown by lines 164 and 166. The first mirror 156 is preferably orientated at a first angle α of approximately 45° with respect to the horizontal by adjusting the orientation of the first mirror 156 on the guide track 152. The orientation of the first mirror 156 causes the direction of the energy beam 104 to be preferably changed from vertical to horizontal. However, one of ordinary skill in the art will readily appreciate that the first mirror 156 can be oriented at other angles without departing from the spirit of invention.

A second 100% reflective mirror 170 is mounted to the frame 122. The second mirror 170 is oriented so that the energy beam 104 is reflected along a path indicated by lines 172 and 174 toward a second lens 176.

The second mirror 170 is orientated at a second angle β with respect to the horizontal. The second angle β is selected so that the energy beam 104 can be focused to the focal point 107 that is along the axis 113. The second angle β is between approximately 30° and 45° with respect to the horizontal. Preferably, the second angle β is approximately 33°.

The second lens 176, which is mounted to the frame 122, focuses the energy beam 104 to the focal point 107 as shown by the intersection of lines 178 and 180. The angular path of the energy beam 104 along lines 178 and 180 allows an angular hole (not shown) to be formed in the workpiece 114.

The orientation of the first mirror 156, the second mirror 170, and the second lens 176 in the frame 122 is commonly referred to as a constant center point cutting device. When the mirrors and lens of the present invention are aligned, there are four axes of rotation that must be aligned.

Figure 1:
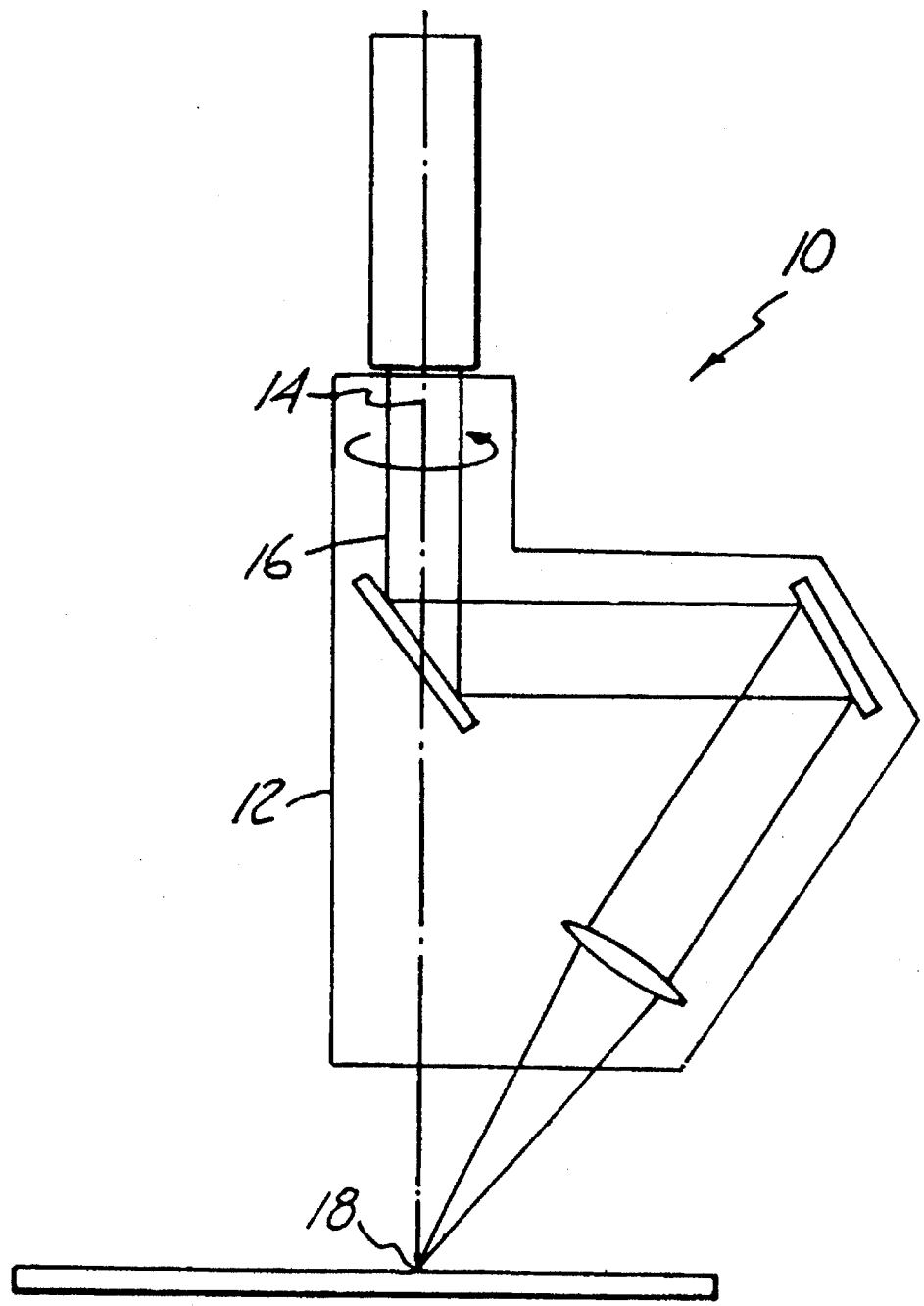
FIG. 1 is a sectional view of a prior art constant center point optical system.
Figure 2:
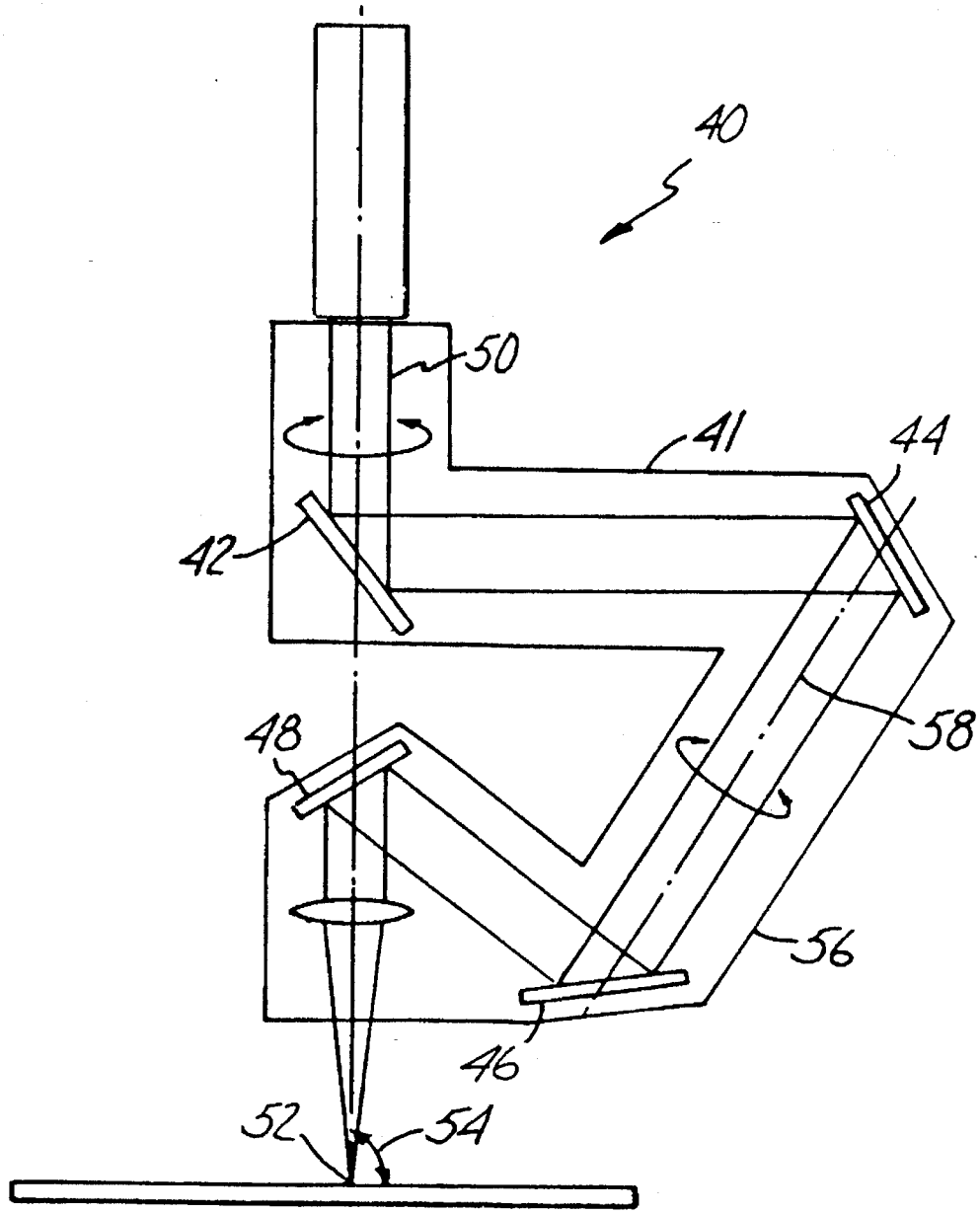
FIG. 2 is a sectional view of another prior art constant center point optical system.

The two mirror cutting device of the present invention has several additional advantages over prior art devices, such as the devices illustrated in FIGS. 1 and 2. The two mirror cutting device is mechanically less complex than the four mirror design. Because the two mirror cutting device has only four axes of rotation, programming of the control circuitry is much less complex than the four mirror cutting device, which has five axes of rotation. As a result, the two mirror cutting device significantly reduces the complexity of beam alignment associated with the four mirror cutting device.

The two mirror cutting device is also more durable than the four mirror cutting device because the two mirror cutting device has fewer mirrors to align and fewer axes of rotation to align. Yet another benefit of the two mirror cutting device is that there is a smaller loss of laser beam power when focusing the energy beam in the two mirror cutting device as opposed to the four mirror cutting device.

The energy beam guide 106 includes a nosepiece 184. The nosepiece 184 has a threaded region 182 that threadably engages a threaded region 181 located proximate to the output end 128 of the frame 122. The threaded relation between the frame 122 and the nosepiece 184 retains the nosepiece 184 in relation to the frame 122. The threaded engagement between the frame 122 and the nosepiece 184 allows the nosepiece 184 to be quickly and easily removed from the frame 122 to permit inspection of the inner cavity 124 of the frame 122.

The nosepiece 184 is of a generally conical shape that tapers from the threaded region 182 to an outlet end 188. The outlet end 188 has an aperture 190 through which the energy beam 104 passes. The aperture 190 is of a sufficient diameter to allow the energy beam 104 to pass through unobstructed and small enough to prevent foreign objects from entering the inner cavity 124.

A circular toothed ring 136 is provided on the input end 126 to control the rotation of the energy beam guide 106. A toothed wheel 138 is rotatably mounted to the protective sleeve 108 proximate to the toothed ring 136 so that teeth on the toothed wheel 138 engage teeth on the toothed ring 136. Rotation of the toothed wheel 138 causes the toothed ring 136 to rotate, which thereby results in rotation of the energy beam guide 106.

The rotation of the toothed wheel 138 is accomplished using methods that are known in the art. For example, as illustrated in FIG. 3, the rotation of the toothed wheel 138 can be controlled by a motor 140 that is mounted to the protective sleeve 108.

Alternatively, a toothed ring 146 can be provided with outwardly directed teeth 148, as illustrated in FIG. 4. The teeth 148 engage a toothed wheel 142 mounted on a shaft 144. Rotation of the shaft 144 causes the toothed wheel 142 to rotate which in turn causes the toothed ring 146 to rotate. Rotation of the shaft 144 can be accomplished through a small motor (not shown) or other means that are known in the art.

The rotational mounting of the energy beam guide 106 allows angled cuts to be formed at different directions in the workpiece 114. The ability to cut in different directions is especially important when working with a relatively large workpiece 114 because the size of the large workpiece 114 hinders the ability to rotate the workpiece 114 when it is desired to cut a differently oriented angled hole in the workpiece 114.

As the energy beam guide 106 is rotated the energy beam 104 remains focused at the focal point 107, regardless as to whether the energy beam 104 is vertically focused at the focal point 107, as illustrated in FIG. 3, or angularly focused at the focal point 107, as illustrated in FIG. 4. Because the energy beam 104 is always focused at the focal point 107, the cutting device is described as operating at zero offset. As a result, an offset handling controller is not required to guide the energy beam 104 to the desired cutting point when the energy beam guide 106 is rotated. The ability to accurately focus the energy beam 104 without the use of the offset handling controller makes the cutting device easier to direct and less susceptible to error.

In addition, the constant focal point orientation of the cutting device 100 results in the rate at which the workpiece 114 moves in the X-Y plane being equal to the rate at which the outlet end 188 moves with relation to the workpiece 114. As a result of the two rates of movement being equal, the energy beam guide 106 of the present invention allows for more simplified energy beam controller programming than for traditional cutting devices that do not operate with zero offset.

When using the energy beam guide 106, it is necessary to prevent mirrors 156 and 170 and lens 146 and 176 from being overheated by the laser beam. To accomplish this result, a cooling stream of pressurizing gas is supplied through the protective sleeve 108 and inner cavity 124 for cooling mirrors 156 and 170 and lens 146 and 176. Alternatively, the pressurizing gas could be used to assist in cutting the workpiece 114. Suitable ducting to direct the pressurizing gas to the workpiece 114 are known in the art.

Figure 5:
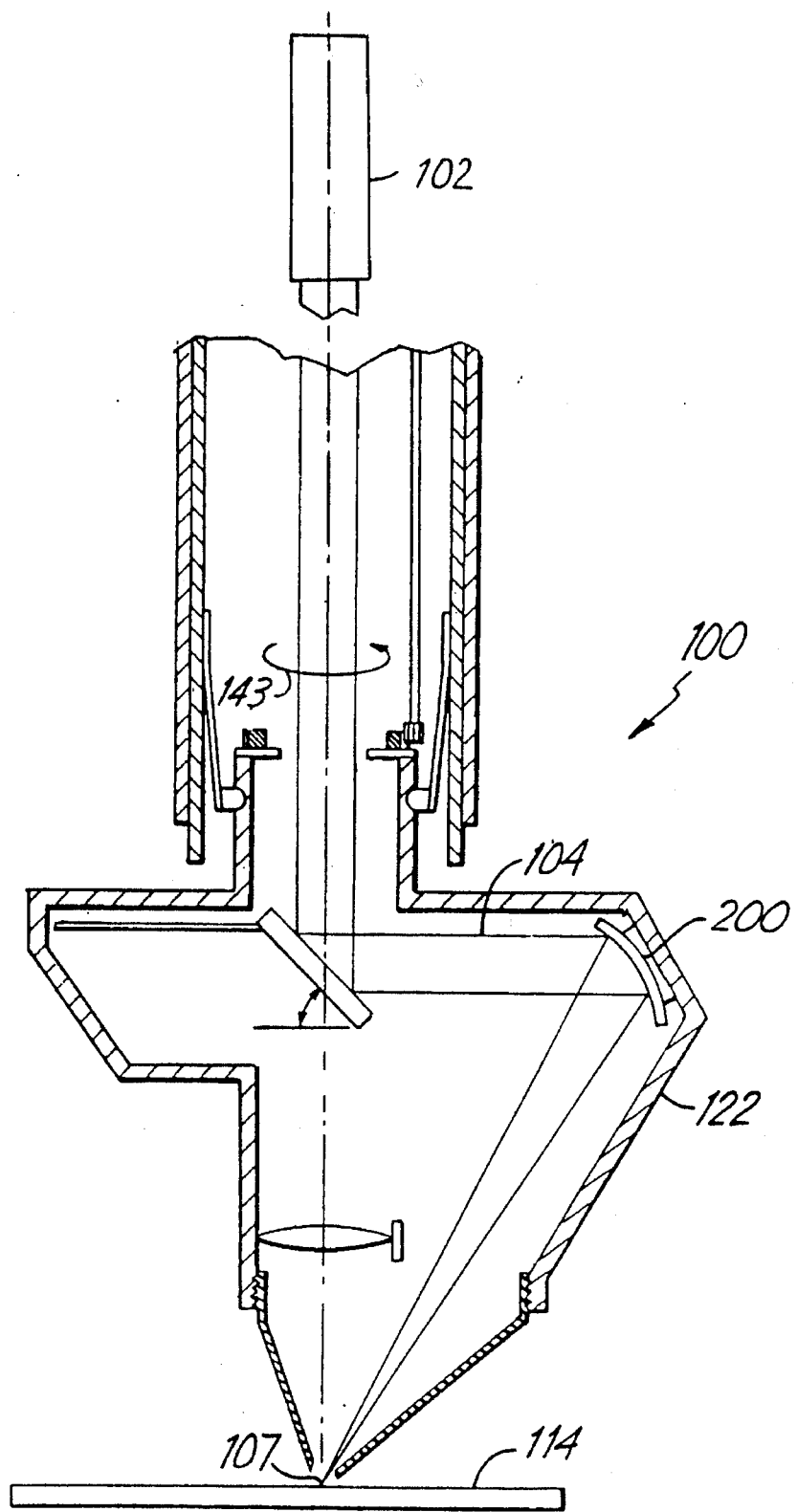
FIG. 5 is a sectional view of an alternative embodiment of the optical system of the present invention.

In another embodiment, a unit 200 directs and focuses the energy beam 104 as illustrated in FIG. 5. The unit 200 acts like the second mirror 170 and the second lens 176, which are illustrated in FIGS. 3 and 4. In this embodiment, the unit 200 is mounted to the frame 122 so that the unit 200 directs and focuses the energy beam 104 to the focal point 107. The unit 200 is preferably a parabolic focusing mirror.

Figure 6:
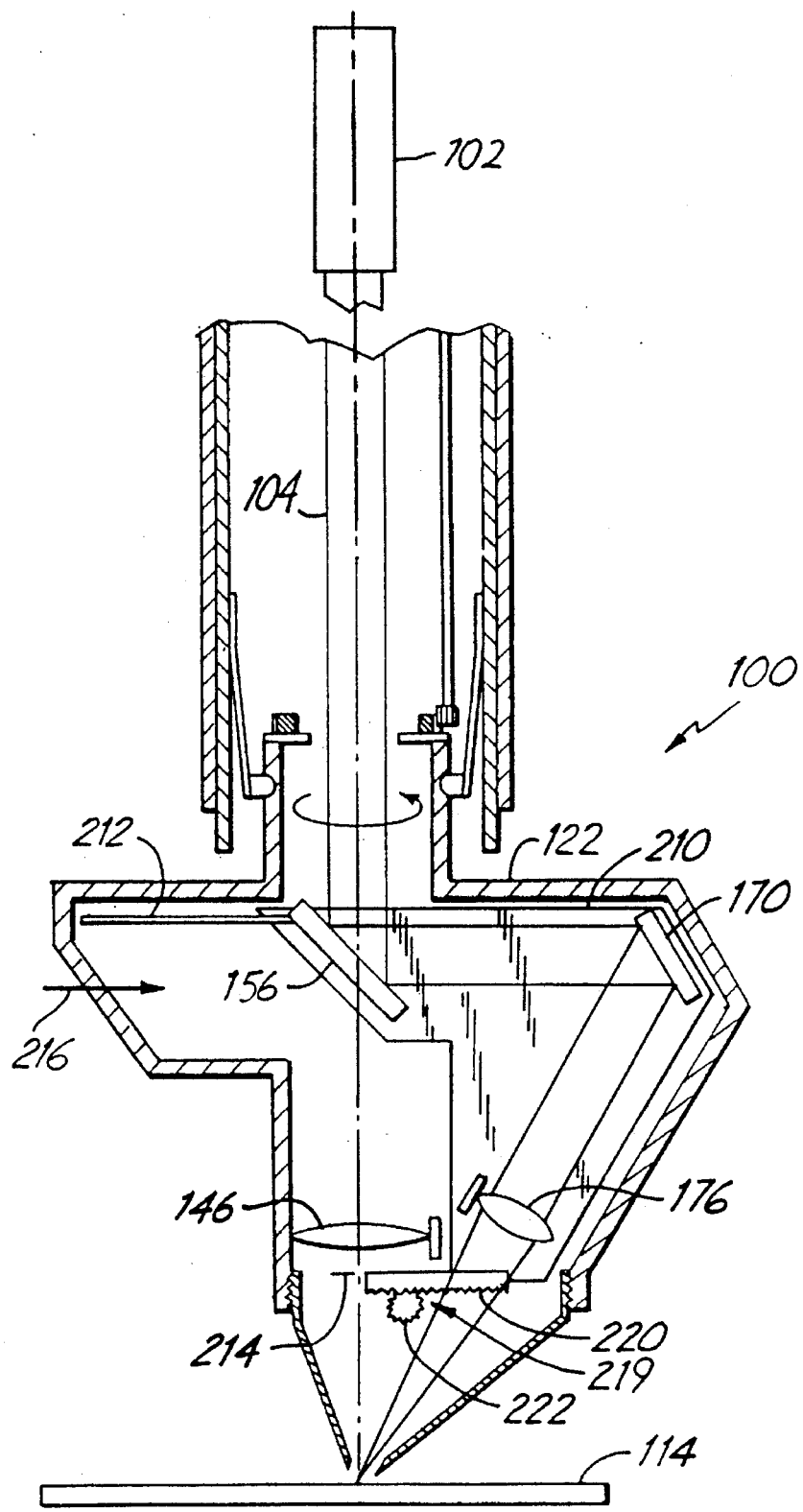
FIG. 6 is a sectional view of another alternative embodiment of the optical system of the present invention.

In still another embodiment of the present invention, a slidable unit 210 is slidably mounted to the frame as illustrated in FIG. 6. The slidable unit 210 includes the first mirror 156, the second mirror 170, and the second lens 176. The unit 210 is slidably mounted to the frame 122 on guide tracks 212 and 214. When the unit 210 is moved as indicated by arrow 216, the first mirror 156 moves into the path of the energy beam 104. The fixed relationship between the first mirror 156, the second mirror 170, and the second lens 176 assists in maintaining the alignment of the energy beam 104.

Similar to the embodiment described with reference to FIGS. 3 and 4, the unit 210 is moved along the guide tracks 212 and 214 by a rack and pinion type mechanism 219. A toothed rack 220 is mounted to the mechanism 210. A toothed pinion 222 is mounted to the frame 122 in engagement with toothed rack 220. Rotation of the toothed pinion is accomplished by mechanisms that are known in the art, such as a motor (not shown).

Although the present invention has been described with reference to preferred embodiments, workers skilled in the art will recognize that changes may be made in form and detail without departing from the spirit and scope of the invention.

What is claimed is:

1. An apparatus for cutting a workpiece in a vertically and angularly oriented manner, the apparatus comprising:

energy source means for providing a beam of energy, the beam of energy traveling along a vertical axis; and directing means for directing the beam of energy from the energy source means to a focal point, the beam of energy being directable along the vertical axis and along an angular axis angularly displaced from the vertical axis, the directing means comprising:

a frame mounted in working relation with respect to the energy source means such that the beam of energy travels through the frame;

first focusing means for focusing the beam of energy to the focal point that lies along the vertical axis, the first focusing means mounted within the frame and positioned along the vertical axis between the energy source means and the focal point;

first reflective mirror slidably mounted within the frame between the energy source means and the first focusing means such that the first reflective mirror is movable into a path of the beam of energy to form a first reflected beam portion; and means for reflecting and focusing the first reflected beam portion to the focal point, the means for reflecting and focusing mounted within the frame.

2. The apparatus according to claim 1, wherein the energy source means includes a laser.

3. The apparatus according to claim 2, wherein the laser is a $CO_2$ laser.

4. The apparatus according to claim 1, wherein the frame is rotatably mounted with respect to the energy source such that the frame can rotate about the axis.

5. The apparatus according to claim 1, wherein the means for reflecting and focusing the first reflected beam portion comprises:

second reflective mirror mounted within the frame and positioned to reflect the first reflected beam portion to form a second reflected beam portion; and second focusing means for focusing the second reflected beam portion to the focal point.

6. The apparatus according to claim 1, wherein the means for reflecting and focusing the first reflected beam portion is a parabolic mirror.

7. The apparatus according to claim 1, wherein the first reflective mirror and the means for reflecting and focusing the first reflected beam portion are contained in a mechanism that is slidably mounted in the directing means so that the first reflective mirror can be moved in the path of the energy beam.

8. The apparatus according to claim 7, wherein the means for reflecting and focusing the first reflected beam portion comprises:

second reflective mirror mounted within the frame and positioned to reflect the first reflected beam portion to form a second reflected beam portion; and second focusing means for focusing the second reflected beam portion to the focal point.

9. The apparatus according to claim 7, wherein the means for reflecting and focusing the first reflected beam portion is a parabolic mirror.

10. An apparatus for cutting a workpiece, the apparatus comprising:

an energy source for providing a beam of energy; and directing means for directing the beam of energy from the energy source to a focal point, the directing means including:

a frame mounted with respect to the energy source such that the beam of energy travels through the frame;

first focusing means disposed along the first axis for focusing the beam of energy to the focal point; and means for intercepting the beam of energy and directing the beam of energy along the second axis, the means for intercepting including means for reflecting and focusing the beam of energy disposed along the second axis for focusing the beam of energy to the focal point, the means for intercepting being mounted within the frame and being movable between a first intercepting beam position and a second non-intercepting beam position.

11. The apparatus of claim 10 wherein the means for intercepting the beam of energy includes a first reflective mirror.

12. The apparatus of claim 11 and further including a second reflective mirror stationary with respect to the first reflective mirror for reflecting the beam along the second axis.

13. The apparatus of claim 12 wherein the means for intercepting including the second reflective mirror movable in cooperation with the first reflective mirror.

14. The apparatus of claim 10 wherein the means for reflecting and focusing is a parabolic mirror.

* * * * *

UNITED STATES PATENT AND TRADEMARK OFFICE
CERTIFICATE OF CORRECTION

PATENT NO. : 5,500,506
DATED : MARCH 19, 1996
INVENTOR(S) : WILLIAM E. LAWSON

It is certified that error appears in the above-indentified patent and that said Letters Patent is hereby corrected as shown below:

Col. 7, line 16, after "point,", insert --the beam is directable along a first axis and a second axis angularly displaced from the first axis, --

Signed and Sealed this

Twenty-fifth Day of June, 1996

*Attest:*

*Attesting Officer*

BRUCE LEHMAN

*Commissioner of Patents and Trademarks*